US011094209B1

(12) United States Patent
Pham

(10) Patent No.: US 11,094,209 B1
(45) Date of Patent: Aug. 17, 2021

(54) LOCATION DETERMINATION WHEN SATELLITE NAVIGATION SYSTEM IS INACCESSIBLE

(71) Applicant: Facebook, Inc., Menlo Park, CA (US)

(72) Inventor: Duong Hai Pham, Sherman Oaks, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/547,624

(22) Filed: Aug. 22, 2019

(51) Int. Cl.
*G01C 21/04* (2006.01)
*G08G 5/04* (2006.01)
*G08G 5/00* (2006.01)
*H04W 4/46* (2018.01)

(52) U.S. Cl.
CPC ........... *G08G 5/045* (2013.01); *G08G 5/0008* (2013.01); *G08G 5/0013* (2013.01); *G08G 5/0021* (2013.01); *G08G 5/0082* (2013.01); *H04W 4/46* (2018.02)

(58) Field of Classification Search
CPC .......... G01S 5/06; G01S 5/0284; G01S 19/46; G01S 5/10; G08G 5/045; G08G 5/0021; G08G 5/0013; G08G 5/0082; G08G 5/0008; H04W 4/46
See application file for complete search history.

(56) References Cited

U.S. PATENT DOCUMENTS

| | | | |
|---|---|---|---|
| 3,761,930 A | | 9/1973 | Bennett et al. |
| 3,935,574 A | * | 1/1976 | Pentheroudakis ........ G01S 3/48 342/424 |
| 7,248,219 B2 | | 7/2007 | Smith et al. |
| 9,922,571 B1 | * | 3/2018 | Greenleaf ............ G08G 5/0013 |
| 2003/0093187 A1 | * | 5/2003 | Walker ............... B64D 45/0059 701/1 |
| 2011/0163908 A1 | * | 7/2011 | Andersson ............ G01S 13/765 342/36 |
| 2017/0082441 A1 | * | 3/2017 | Haglund ................. G01S 19/20 |
| 2019/0383949 A1 | * | 12/2019 | Sasaki ................... G01S 5/0284 |
| 2020/0105151 A1 | * | 4/2020 | Mahkonen ............ B64C 39/024 |

OTHER PUBLICATIONS

Wikipedia, "Automatic dependent surveillance—broadcast", URL: https://en.wikipedia.org/wiki/Automatic_dependent_surveillance_broadcast, as accessed on Aug. 22, 2019, 18 pages.
Wikipedia, "Traffic collision avoidance system", URL: https://en.wikipedia.org/wiki/Traffic_collision_avoidance_system, as accessed on Aug. 22, 2019, 18 pages.

* cited by examiner

*Primary Examiner* — Hongmin Fan
(74) *Attorney, Agent, or Firm* — FisherBroyles, LLP

(57) ABSTRACT

The disclosed method may include (1) receiving, at a receiving vehicle from a first transmitting vehicle, a first wireless signal carrying first data indicating a first location of the first transmitting vehicle, (2) determining a first bearing from which the first wireless signal is received at the receiving vehicle, (3) receiving, at the receiving vehicle from a second transmitting vehicle, a second wireless signal carrying second data indicating a second location of the second transmitting vehicle, (4) determining a second bearing from which the second wireless signal is received at the receiving vehicle, and (5) determining a receiving location of the receiving vehicle by triangulation using the first location, the first bearing, the second location, and the second bearing. Various other methods, systems, and computer-readable media are also disclosed.

20 Claims, 9 Drawing Sheets

LOCATION DETERMINATION WHEN SATELLITE NAVIGATION SYSTEM IS INACCESSIBLE

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
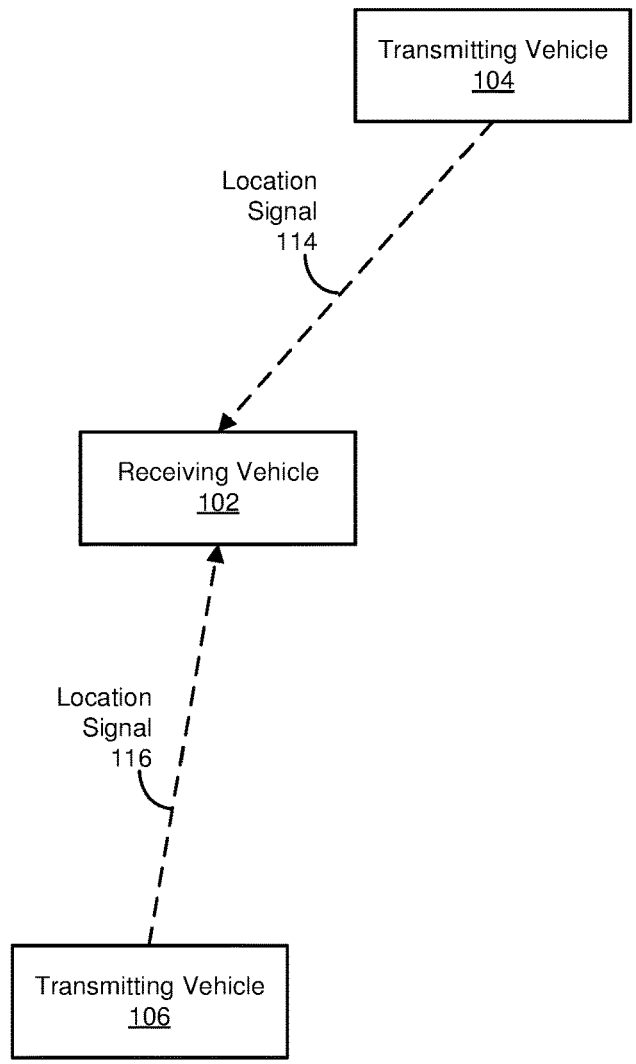
FIG. 1 is a block diagram of an exemplary operating environment in which systems and methods for determining a location of a vehicle without access to a satellite navigation system may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The popularity and usefulness of the Global Positioning System (GPS) as a provider of positioning, navigation, and timing (PNT) services has spawned the creation of other global navigation satellite systems (GNSSes), including Galileo (provided by the European Union), GLONASS (Globalnaya Navigazionnaya Sputnikovaya Sistema) (owned and operated by the Russian Federation), and others. While the use of such GNSSes have proven invaluable in many environments, such as in the navigation of vehicles both in the air and on the ground, access to such systems is not guaranteed due to communication equipment failures and hostile or unintentional jamming of GNSS signals that may occur from time to time. Moreover, traditional solutions to preemptively mitigate a GNSS denial condition typically involve supplementary hardware, as well as the additional attendant cost and mass, to be incorporated into the vehicle, and may also necessitate additional infrastructure external to the vehicle.

The present disclosure is generally directed to systems and methods of location determination without satellite navigation system access. As will be explained in greater detail below, embodiments of the present disclosure may involve a vehicle receiving wireless signals from two other vehicles that carry location information regarding those other vehicles. Based on the location information, as well as the bearing from which those signals are received at the receiving vehicle, triangulation may then be employed to determine a location of the receiving vehicle. In some embodiments, existing commercial off-the-shelf (COTS) navigational (e.g., avionics) components may be utilized to receive and/or generate the associated information, thus potentially reducing the need for added mass, cost, or complexity in the vehicle while providing at least some navigational ability for a vehicle in a GNSS-denied environment.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-9, detailed descriptions of systems and methods for location determination in the absence of satellite navigation system access. An exemplary operating environment in which embodiments of systems and methods for determining a location of a vehicle without access to a satellite navigation system is described in connection with FIG. 1. An exemplary method and system for determining a location of a vehicle without access to a satellite navigation system, such as within the operating environment of FIG. 1, are discussed in conjunction with FIGS. 2 and 3. A more specific exemplary operating environment, as well as an associated system and method, for determining a location of an aircraft without access to a satellite navigation system are explained in relation to with FIGS. 4, 5, and 6, respectively. Possible antennas employable for determining a bearing from which signals including location information transmitted from other aircraft are discussed in conjunction with FIGS. 7 and 8. A simplified two-dimensional triangulation example for determining a location of an aircraft receiving wireless signals carrying location information from two other aircraft is explained in association with FIG. 9.

In some embodiments described below, the term "satellite navigation system" may refer to a global navigation satellite system (GNSS) (e.g., GPS, Galileo, and the like), a regional satellite navigation system, or any other navigation system employing satellites that transmit signals to provide positioning, navigation, and timing (PNT) services.

Also, in some embodiments, the term "vehicle" may refer to any ground-based or airborne vehicle, while the term "aircraft" may refer to any airborne vehicle, whether directly operated by one or more humans, remotely operated, or otherwise autonomous. For example, the term "aircraft" may include uncrewed autonomous vehicles (UAVs).

FIG. 1 is a block diagram of an exemplary operating environment 100 in which systems and methods for determining a location of a receiving vehicle 102 without access to a satellite navigation system may be employed. As depicted in FIG. 1, receiving vehicle 102 may receive a first location signal 114 from a first transmitting vehicle 104 and receive a second location signal 116 from a second transmitting vehicle 106. In various examples, zero or more of transmitting vehicles 104 and 106 and receiving vehicle 102 may be moving while location signals 114 and 116 are being transmitted. Further, in at least some embodiments, first location signal 114 may include information indicating a current location of first transmitting vehicle 104, and first location signal 114 may include information indicating a current location of first transmitting vehicle 104. Additionally, in some examples, the location information included in location signals 114 and 116 may be updated on an ongoing basis as transmitting vehicles 104 and 106 travel.

Figure 2:
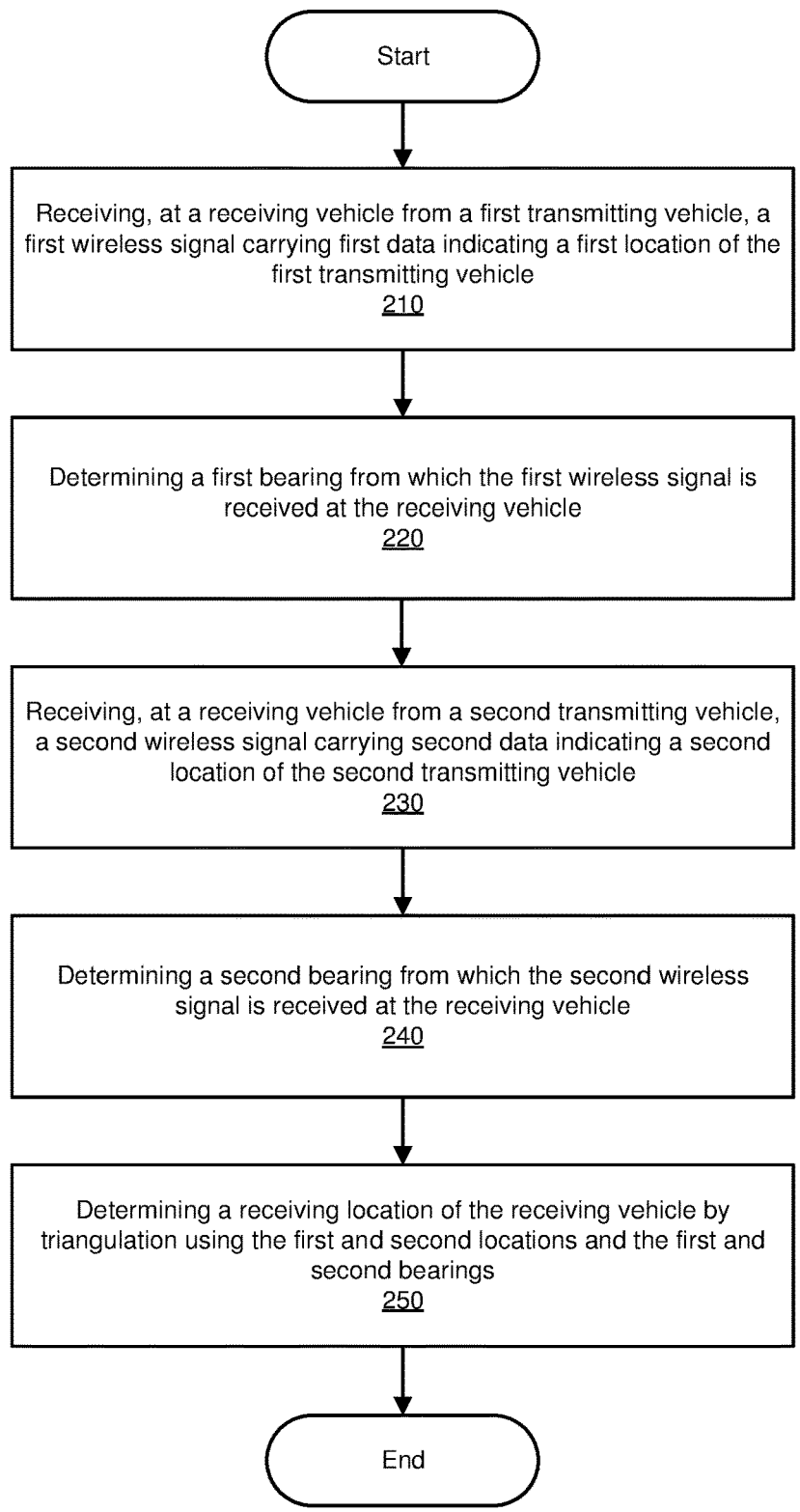
FIG. 2 is a flow diagram of an exemplary method for determining a location of a vehicle without access to a satellite navigation system, such as within the operating environment of FIG. 1.

In association with operating environment 100 of FIG. 1, FIG. 2 is a flow diagram of an exemplary method 200 for determining a location of receiving vehicle 102 without access to a satellite navigation system. In some embodiments, receiving vehicle 102 may have lost access to the satellite navigation system for some period of time, thus causing receiving vehicle 102 to generate data indicating its location based on wireless signals transmitted by two or more transmitting vehicles 104 and 106. In some examples, each of the steps shown in FIG. 2 may represent an algorithm whose structure includes and/or is represented by multiple sub-steps, examples of which will be provided in greater detail below.

In method 200, at step 210, receiving vehicle 102 may receive, from first transmitting vehicle 104, first location signal 114 carrying first data indicating a first location of first transmitting vehicle 104. At step 220, a first bearing from which first location signal 114 is received at receiving vehicle 102 may be determined. Correspondingly, at step 230, receiving vehicle 102 may receive, from second transmitting vehicle 106, second location signal 116 carrying second data indicating a second location of second transmitting vehicle 106, while at step 240, a second bearing from which second location signal 116 is received at receiving vehicle 102 may be determined. Thereafter, at step 250, a receiving location of receiving vehicle 102 may be determined by triangulation using the first and second locations and the first and second bearings. While method 200 and operating environment 100 indicate the use of two transmitting vehicles 104 and 106 for generating the receiving location of receiving vehicle 102, three or more wireless location signals from a corresponding number of transmitting vehicles may be employed to generate the receiving location of receiving vehicle 102, which may render greater accuracy or confidence in the generated location in some examples.

Figure 3:
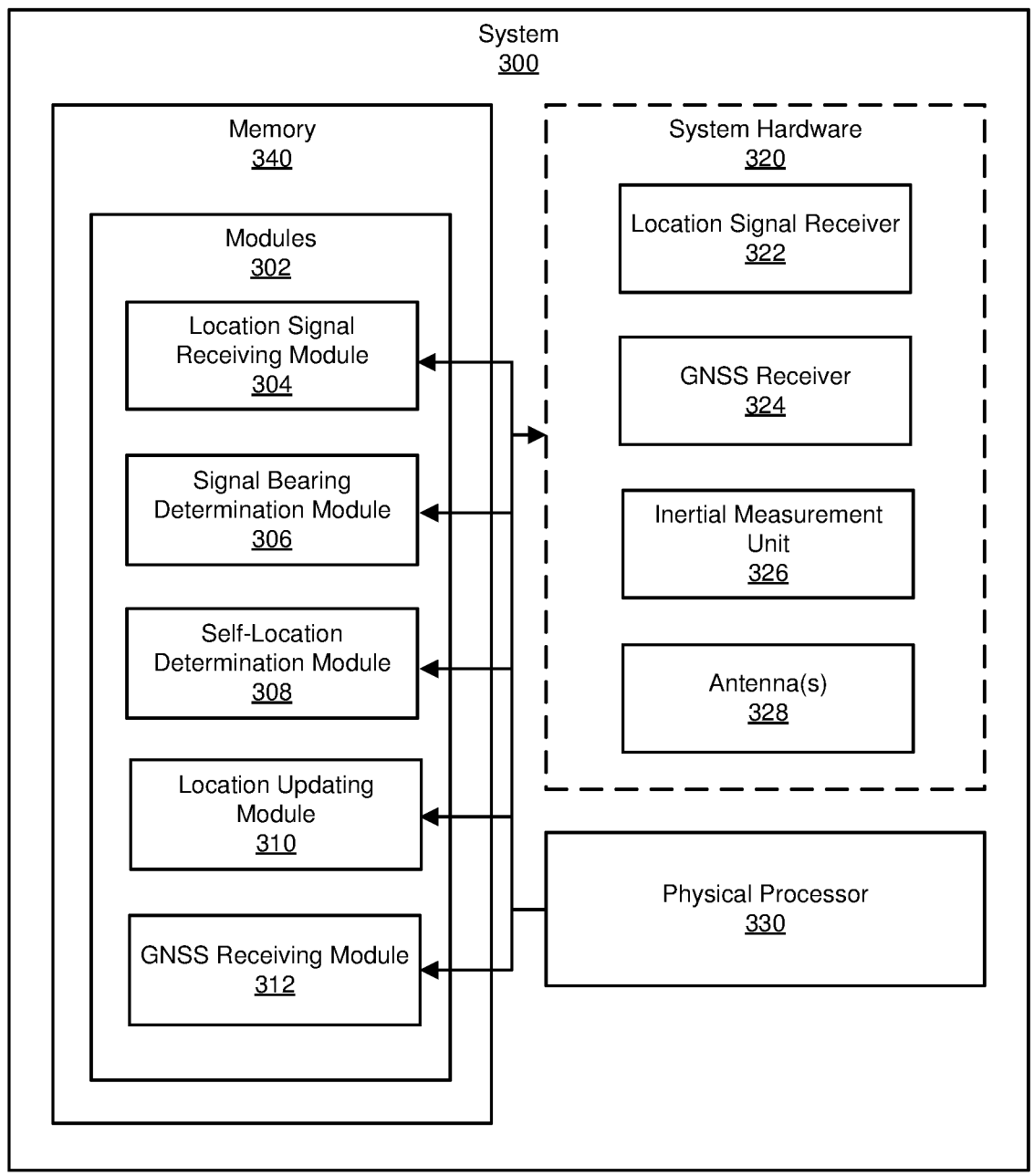
FIG. 3 is a block diagram of an exemplary system for determining a location of a vehicle without access to a satellite navigation system, such as within the operating environment of FIG. 1.

FIG. 3 is a block diagram of an exemplary system 300 for determining a location of receiving vehicle 102 without access to a satellite navigation system. System 300, in some embodiments, may be entirely incorporated into receiving vehicle 102, while in other examples, one or more portions of system 300 may be resident in a system or facility external to receiving vehicle 102. As illustrated in FIG. 3, system 300 may include one or more modules 302 for performing one or more tasks. As will be explained in greater detail below, modules 302 may include a location signal receiving module 304, a signal bearing determination module 306, a self-location determination module 308, a location updating module 310, and a GNSS receiving module 312.

In certain embodiments, one or more of modules 302 in FIG. 3 may represent one or more software applications or programs that, when executed by a computing device, may cause the computing device to perform one or more tasks. For example, and as will be described in greater detail below, one or more of modules 302 may represent modules stored and configured to run on one or more computing devices. One or more of modules 302 in FIG. 3 may also represent all or portions of one or more special-purpose computers configured to perform one or more tasks.

As illustrated in FIG. 3, exemplary system 300 may also include one or more memory devices, such as memory 340. Memory 340 generally represents any type or form of volatile or non-volatile storage device or medium capable of storing data and/or computer-readable instructions.

As also depicted in FIG. 3, exemplary system 300 may further include one or more physical processors, such as physical processor 330. Physical processor 330 generally represents any type or form of hardware-implemented processing unit capable of interpreting and/or executing computer-readable instructions. In one example, physical processor 330 may access and/or modify one or more of modules 302 stored in memory 340. Additionally or alternatively, physical processor 330 may execute one or more of modules 302 to determine a location of a vehicle that cannot access a satellite navigation system.

As illustrated in FIG. 3, exemplary system 300 may also include one or more system hardware 320 components, such as a location signal receiver 322, a GNSS receiver 324, an inertial measurement unit (IMU) 326, and/or one or more antennas 328. In some embodiments, location signal receiver 322 may receive first location signal 114 from transmitting vehicle 104 and second location signal 116 from transmitting vehicle 106 (e.g., by way of one or more of antennas 328). GNSS receiver 324 may receive GNSS signals (e.g., from GNSS system satellites via one or more of antennas 328) when such signals are available to system 300. IMU 326 may generate information indicating movement of receiving vehicle 102 (e.g., by indicating changes in location and/or orientation of receiving vehicle 102), such as by way of one or more accelerometers, gyroscopes, and so on.

Returning to modules 302, location signal receiving module 304 may receive location information from location signal receiver 322 (e.g., by detecting or extracting the location information embedded, encoded, or otherwise included in first location signal 114 and second location signal 116.)

Signal bearing determination module 306 may determine a bearing or direction from which first location signal 114 and second location signal 116 are received. In some embodiments, signal bearing determination module 306 may measure an angle of arrival (AoA) of first location signal 114 and second location signal 116 at receiving vehicle 102. For example, to determine an AoA of first location signal 114, multiple antennas 328, or multiple elements of an antenna, may be employed to receive first location signal 114, and a phase difference between the arrival of first location signal 114 at the multiple antennas 328 or antenna elements may be measured so that the AoA of first location signal 114, and thus the bearing from which first location signal 114 is received, may be calculated. A corresponding measurement of the AoA of second location signal 116 may also be performed. Other methods for determining the bearing from which first location signal 114 and second location signal 116 are received at receiving vehicle 102 may be employed in other embodiments.

Self-location determination module 308, in some embodiments, may determine, by way of triangulation, a location of receiving vehicle 102 based on the location information for first transmitting vehicle 104 and second transmitting vehicle 106, and on the bearings from which first location signal 114 and second location signal 116 are received, which may indicate the directions of first transmitting vehicle 104 and second transmitting vehicle 106 from the perspective of receiving vehicle 102.

Location updating module 310, in some embodiments, may update the location of receiving vehicle 102 generated by self-location determination module 308 using additional available information. For example, location updating module 310 may receive information from IMU 326 that indicates acceleration and/or rotation of receiving vehicle 102 that has occurred since the most recently calculated location of receiving vehicle 102 to derive a current location of receiving vehicle 102. Other types of information may be received to update the current location of receiving vehicle 102 in other embodiments.

GNSS receiving module 312 may receive information (e.g., from GNSS receiver 324) indicating the location of receiving vehicle 102. In some examples, calculation of the current location of receiving vehicle 102, as performed by self-location determination module 308, as described above, may be performed in the event access to a GNSS system via GNSS receiver 324 is denied, or in the presence of some other error condition preventing the reception of accurate location data via GNSS receiver 324. In other embodiments, calculation of the current location via self-location determination module 308 may be performed in the background in the event GNSS access is denied, or as a supplementary determination of location while GNSS access is available.

Figure 4:
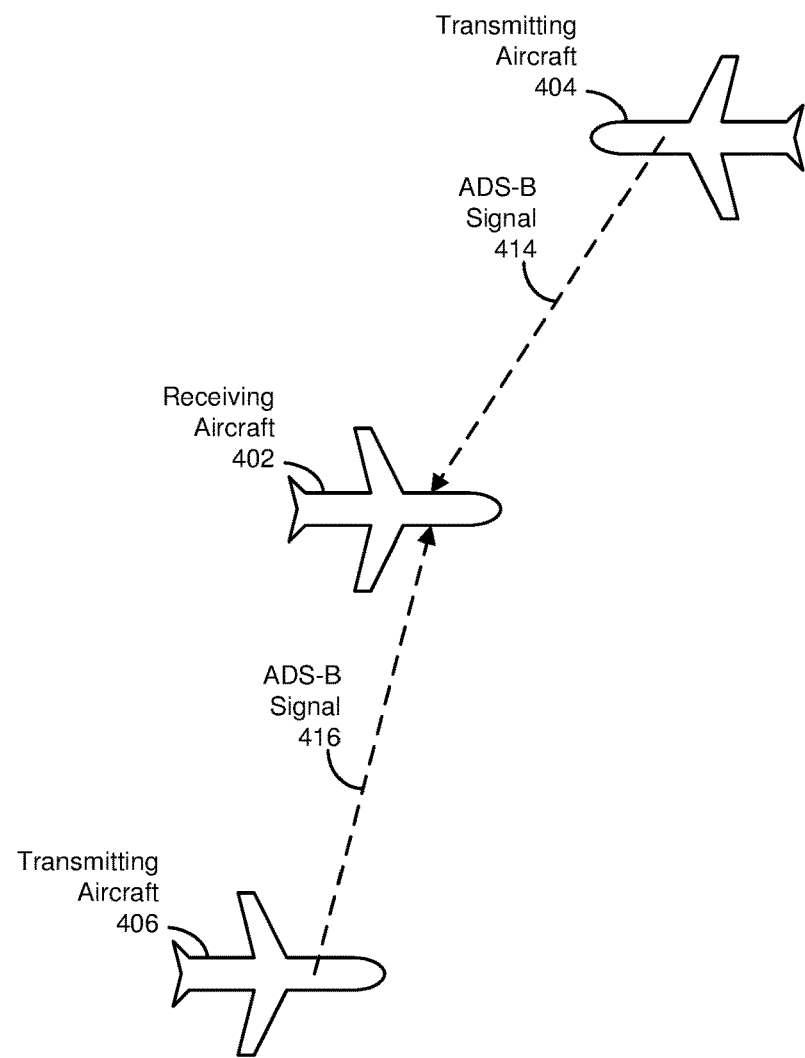
FIG. 4 is a block diagram of an exemplary operating environment in which systems and methods for determining a location of an aircraft without access to a satellite navigation system may be employed.

FIG. 4 is a block diagram of an exemplary operating environment 400 in which systems and methods for determining a location of a receiving aircraft 402 (e.g., serving as receiving vehicle 102 of FIG. 1) without access to a satellite navigation system may be employed using a first transmitting aircraft 404 (e.g., serving as first transmitting vehicle 104) and a second transmitting aircraft 406 (e.g., serving as second transmitting vehicle 106). In some embodiments, each of receiving aircraft 402, first transmitting aircraft 404, and second transmitting aircraft 406 may be piloted directly by a human, remotely piloted, or self-piloted, such as a UAV.

In operating environment 400, receiving aircraft 402 (e.g., while in flight) may receive a first Automatic Dependent Surveillance-Broadcast (ADS-B) signal 414 from first transmitting aircraft 404 and a second ADS-B signal 416 from second transmitting aircraft 406. ADS-B, as the term is used herein, is a standardized technology in which an aircraft automatically and periodically broadcasts its own position (e.g., latitude, longitude, and possibly altitude, possibly in addition to aircraft identification and velocity data) so that the aircraft may be tracked by other aircraft and ground-based tracking systems, such as air traffic control stations. Typically, the aircraft determines its own position for broadcast by way of a satellite navigation system (e.g., a GNSS), although other means for determining position may be used in other examples. More specifically, aircraft may be equipped with an ADS-B Out system (by which the aircraft may broadcast its location and other information to other aircraft and/or ground stations) and/or an ADS-B In system (by which other aircraft may receive ADS-B Out system data from other aircraft).

Further, in operation environment 400, receiving aircraft 402 may determine a bearing from which each of first ADS-B signal 414 and second ADS-B signal 416 are received at receiving aircraft 402 (e.g., by way of AoA determination). Based on the location information included in first ADS-B signal 414 and second ADS-B signal 416 and the bearings of first ADS-B signal 414 and second ADS-B signal 416 relative to receiving aircraft 402, a current location of receiving aircraft 402 may be calculated in the absence of GNSS information access. A simplified example of such a calculation is provided below in conjunction with FIG. 9.

Figure 5:
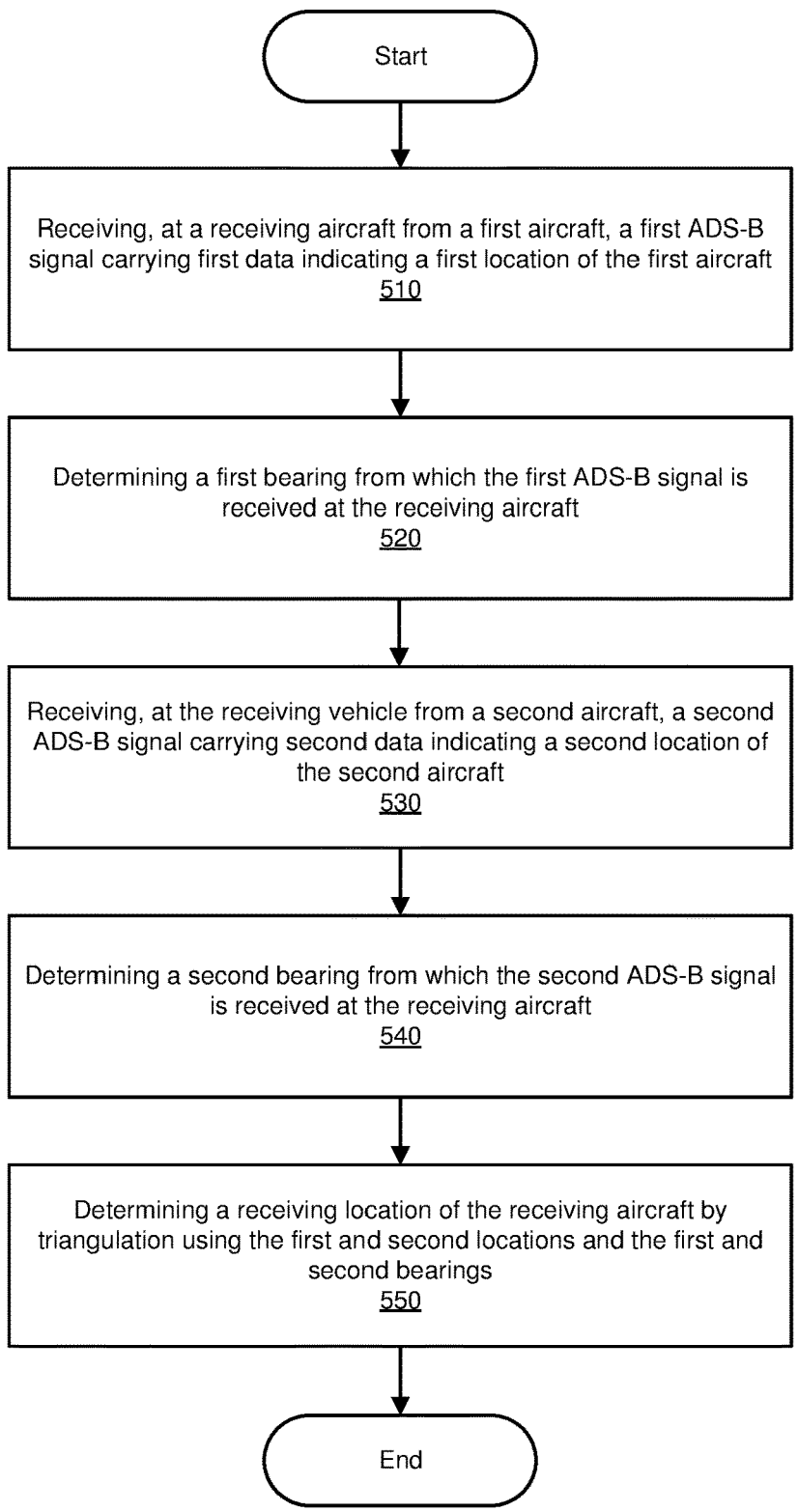
FIG. 5 is a flow diagram of an exemplary method for determining a location of an aircraft without access to a satellite navigation system, such as within the operating environment of FIG. 4.

FIG. 5 is a flow diagram of an exemplary method 500 for determining a location of an aircraft (e.g., receiving aircraft 402 of operating environment 400) without access to a satellite navigation system. In some embodiments, receiving aircraft 402 may have lost access to the satellite navigation system for some period of time, thus causing receiving aircraft 402 to generate data indicating its location based on ADS-B Out signals transmitted by two or more transmitting aircraft 404 and 406. In some examples, each of the steps shown in FIG. 5 may represent an algorithm whose structure includes and/or is represented by multiple sub-steps, examples of which will be provided in greater detail below.

In method 500, at step 510, receiving aircraft 402 may receive, from first transmitting aircraft 404, first ADS-B signal 414 carrying first data indicating a first location of first transmitting aircraft 404. At step 520, a first bearing from which first ADS-B signal 414 is received at receiving aircraft 402 may be determined. Correspondingly, at step 530, receiving aircraft 402 may receive, from second transmitting aircraft 406, second ADS-B signal 416 carrying second data indicating a second location of second transmitting aircraft 406, while at step 540, a second bearing from which second ADS-B signal 416 is received at receiving aircraft 402 may be determined. Thereafter, at step 550, a receiving location of receiving aircraft 402 may be determined by triangulation using the first and second locations and the first and second bearings. While method 500 and operating environment 400 indicate the use of two transmitting aircraft 404 and 406 for generating the receiving location of receiving aircraft 402, three or more ADS-B Out signals from a corresponding number of transmitting aircraft may be employed to generate the receiving location of receiving aircraft 402, which may render greater accuracy and/or confidence in the generated receiving location in some embodiments.

Figure 6:
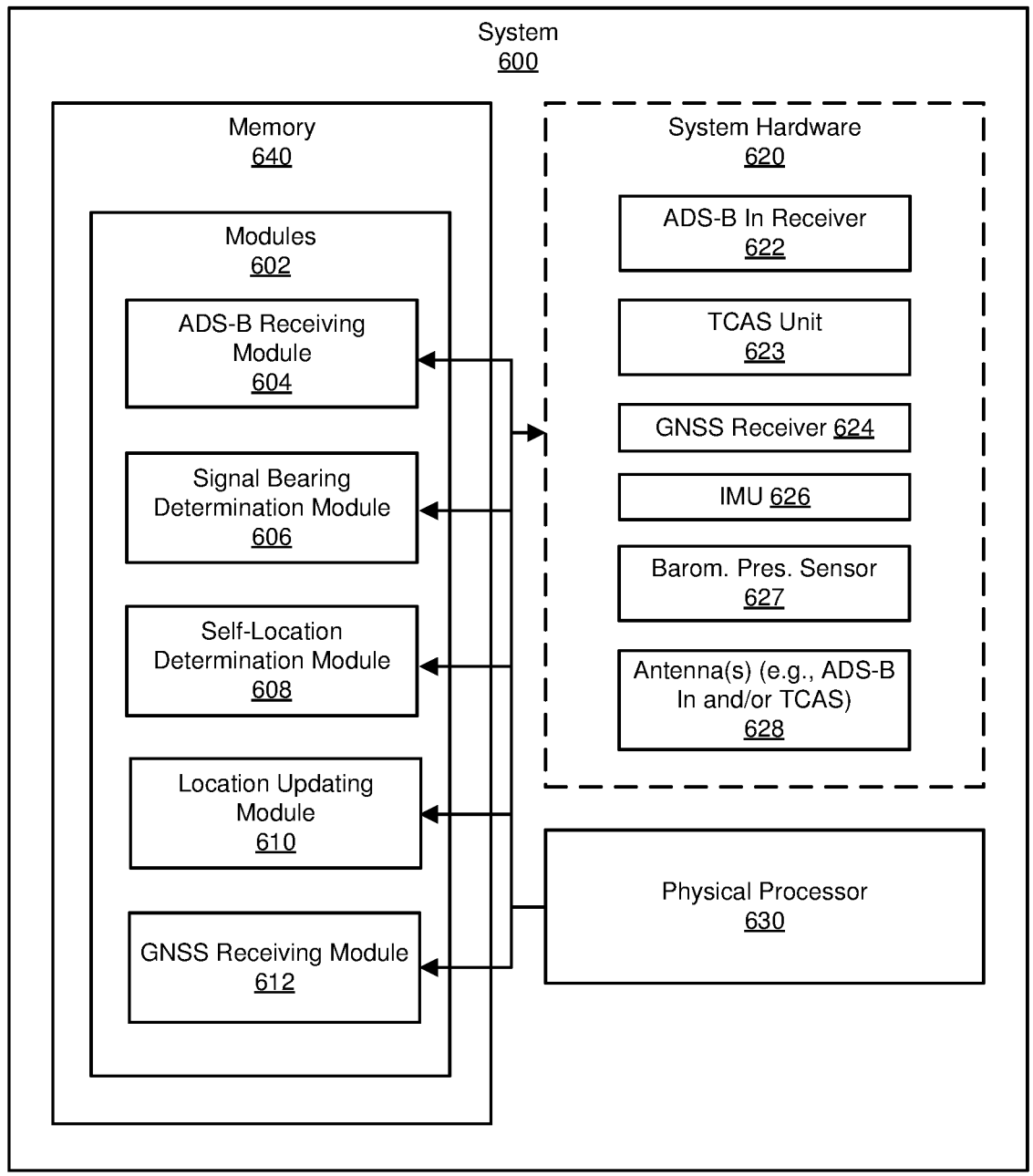
FIG. 6 is a block diagram of an exemplary system for determining a location of an aircraft without access to a satellite navigation system, such as within the operating environment of FIG. 4.

FIG. 6 is a block diagram of an exemplary system 600 for determining a location of an aircraft (e.g., receiving aircraft 402 of operating environment 400) without access to a satellite navigation system. System 600, in some embodiments, may be entirely incorporated into receiving aircraft 402, while in other examples, one or more portions of system 600 may be resident in a system or facility external to receiving aircraft 402 (e.g., a ground-based air traffic control system). As depicted in FIG. 6, system 600 may include one or more modules 602 for performing one or more tasks. As will be explained in greater detail below, modules 602 may include an ADS-B receiving module 604, a signal bearing determination module 606, a self-location determination module 608, a location updating module 610, and a GNSS receiving module 612.

As with the modules 302 of system 300, in certain embodiments, one or more of modules 602 in FIG. 6 may represent one or more software applications or programs that, when executed by a computing device, may cause the computing device to perform one or more tasks. System 600 may also include one or more memory devices, such as memory 640. Memory 640 generally represents any type or form of volatile or non-volatile storage device or medium capable of storing data and/or computer-readable instructions, as noted above, as well as store, load, and/or maintain one or more of modules 602. Moreover, system 600 may also include one or more physical processors, such as physical processor 630 that, like physical processor 330 of FIG. 3, generally represents any type or form of hardware-implemented processing unit capable of interpreting and/or executing computer-readable instructions. In one example, physical processor 630 may access and/or modify one or more of modules 602 stored in memory 640. Additionally or alternatively, physical processor 630 may execute one or more of modules 602 to determine a location of an aircraft that cannot access a satellite navigation system.

As illustrated in FIG. 6, exemplary system 600 may also include one or more system hardware 620 components, such as an ADS-B In receiver 622, a Traffic Collision Avoidance System (TCAS) unit 623, a GNSS receiver 624, an IMU 626, a barometric pressure sensor 627, and/or one or more antennas 628 (e.g., one or more single-element or multielement antennas for ADS-B In receiver 622 and/or TCAS unit 623).

ADS-B In receiver 622, in some embodiments, as indicated above, receives from other aircraft (e.g., first transmitting aircraft 404 and second transmitting aircraft 406) ADS-B Out signals that include location information of the transmitting aircraft. In some examples, ADS-B Out signals may operate at a frequency of 1090 megahertz (MHz) and be received via one or more ADS-B In antennas and/or a multielement TCAS antenna, as a TCAS antenna may be shared with ADS-B In receiver 622 in some cases.

In some embodiments, TCAS unit 623 employs a standardized interrogation-and-response algorithm in which the aircraft interrogates other aircraft in the vicinity of the interrogating aircraft (e.g., by way of a 1030 MHz signal) and responds to interrogatories received from other aircraft (e.g., via a transponder transmitting a 1090 MHz signal). In some examples, the interrogating aircraft may generate information about the responding aircraft, such as altitude (e.g., as reported in the response), range (e.g., based on the interrogation-and-response signal round trip time), and bearing (e.g., determined by a directional (for example, multielement) antenna 628 employed to receive the response) to detect potential collision conditions. TCAS unit 623 may also negotiate mutual avoidance maneuvers between the interrogating and responding aircraft based on the existence of a detected potential collision.

GNSS receiver 624, in a manner at least similar to that of GNSS receiver 324, may receive GNSS signals (e.g., from GNSS system satellites via one or more of antennas 628) when such signals are available to receiving aircraft 402. Also, IMU 626, in a manner at least similar to IMU 323 of FIG. 3, may generate information indicating movement of receiving aircraft 402 (e.g., indicating changes in location and/or orientation of receiving aircraft 402), such as by way of one or more accelerometers, gyroscopes, and the like. Barometric pressure sensor 627, in some examples, may generate an indication of a current barometric pressure experienced at receiving aircraft 402, which may then be employed to determine an altitude of receiving aircraft 402.

Figure 7:
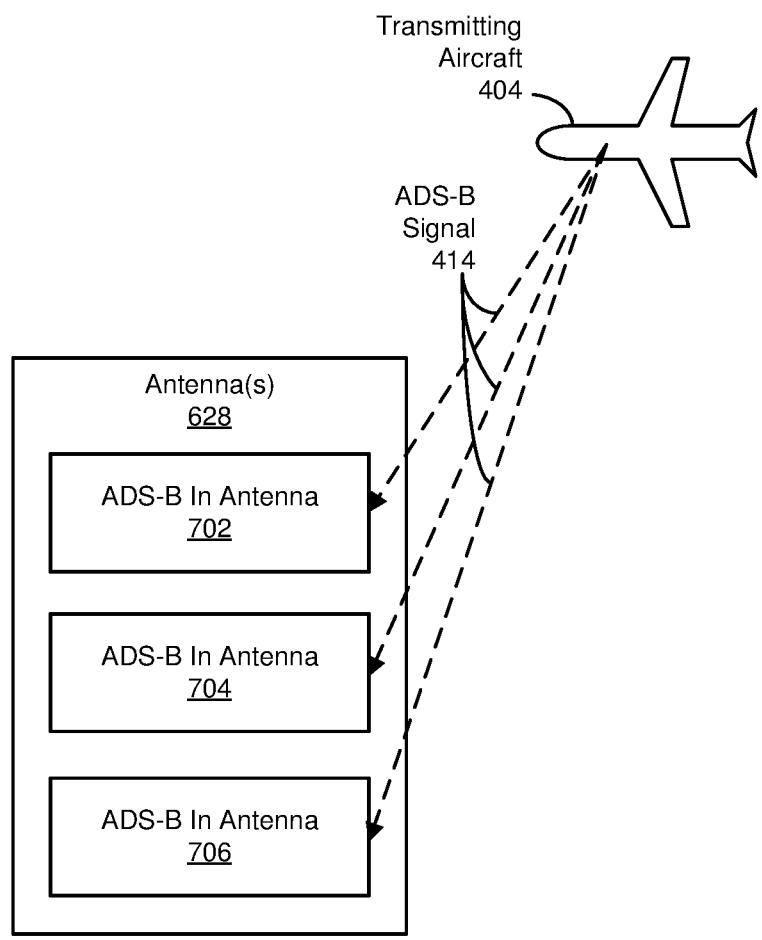
FIG. 7 is an exemplary group of one or more antennas employable in the system of FIG. 6, in which the antennas may include multiple Automatic Dependent Surveillance-Broadcast (ADS-B) In single-element antennas for determining a bearing at which a signal carrying location information is received from another aircraft.

One or more antennas 628 (e.g., one or more single-element or multielement antennas for ADS-B In receiver 622 and/or TCAS unit 623) may be employed in receiving aircraft 402 in a number of ways. For example, FIG. 7 is a block diagram of an exemplary set of antennas 628 that may include multiple ADS-B In single-element antennas (e.g., a first ADS-B In antenna 702, a second ADS-B In antenna 704, and a third ADS-B In antenna 706) for determining a bearing at which first ADS-B signal 414, carrying location information for transmitting aircraft 404, is received at receiving aircraft 402. In such an example, ADS-B In receiver 622 or signal bearing determination module 606 (discussed below) may measure a phase difference between first ADS-B signal 414 as received at first ADS-B In antenna 702, first ADS-B signal 414 as received at second ADS-B In antenna 704, and first ADS-B signal 414 as received at third ADS-B In antenna 706 to determine an AoA, and thus a bearing, in three-dimensional space from which first ADS-B signal 414 is received. A bearing from which second ADS-B signal 416 is received at receiving aircraft 402 may be determined in a corresponding manner.

Figure 8:
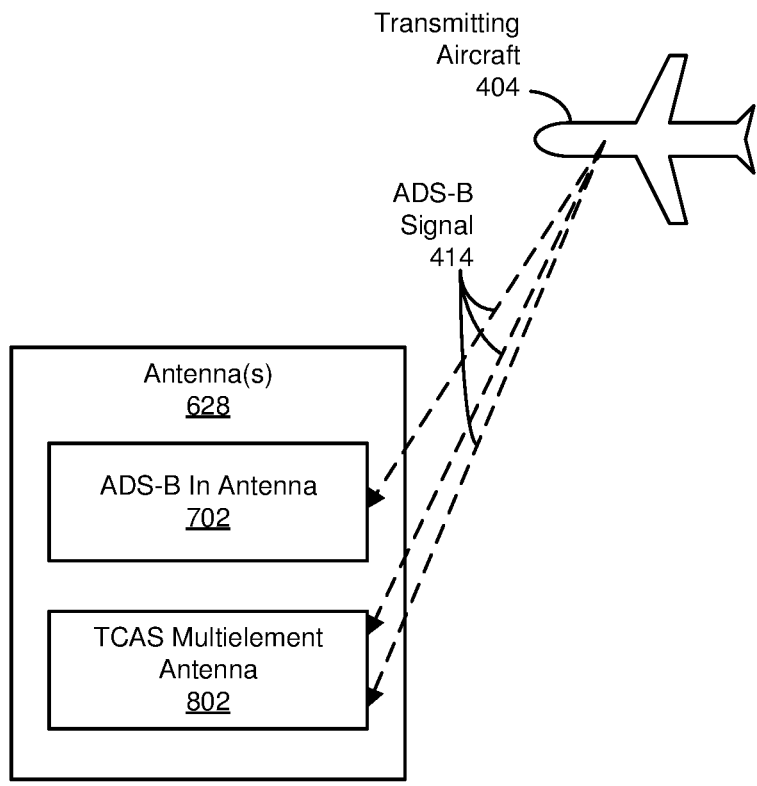
FIG. 8 is an exemplary group of one or more antennas employable in the system of FIG. 6, in which the antennas may include a Traffic Collision Avoidance System (TCAS) multielement antenna for determining a bearing at which a signal carrying location information is received from another aircraft.

In another example, FIG. 8 is a block diagram of an exemplary group of one or more antennas 628 that may include ADS-B In antenna 702 for receiving an ADS-B In signal (e.g., first ADS-B signal 414 from first transmitting aircraft 404) for use by ADS-B In receiver 622, as well as a TCAS directional (e.g., multielement) antenna 802 for determining a bearing at which the same ADS-B In signal is received at receiving aircraft 402. In some embodiments, this capability may be facilitated by the fact that first ADS-B signal 414 and TCAS response signals may both operate at approximately the same frequency (e.g., 1090 MHz, as mentioned above). In at least some examples, second ADS-B signal 416 from second transmitting aircraft 406 may be processed using ADS-B In antenna 702 and TCAS multielement antenna 802 in a corresponding manner.

Returning to modules 602 of FIG. 6, ADS-B receiving module 604 may receive location information from ADS-B In receiver 622 (e.g., by detecting or extracting the location information embedded, encoded, or otherwise included in first ADS-B signal 414 and second ADS-B signal 416.)

Signal bearing determination module 606 may determine a bearing or direction from which first ADS-B signal 414 and second ADS-B signal 416 are received. In some embodiments, signal bearing determination module 606 may measure an AoA of first ADS-B signal 414 and second ADS-B signal 416 at receiving aircraft 402. For example, to determine an AoA of first ADS-B signal 414, multiple antennas 628, or multiple elements of an antenna 628, may be employed to receive first ADS-B signal 414 (as indicated above in conjunction with FIGS. 7 and 8), and a phase difference between the arrival of first ADS-B signal 414 at the multiple antennas 628 or antenna elements may be measured so that the AoA of first ADS-B signal 414, and thus the bearing from which first ADS-B signal 414 is received, may be calculated. These operations may be performed in signal bearing determination module 606, or signal bearing determination module 606 may receive the results of such operations as they are performed by ADS-B In receiver 622 and/or TCAS unit 623. A corresponding measurement of the AoA of second ADS-B signal 416 may also be performed. Other methods for determining the bearing from which first ADS-B signal 414 and second ADS-B signal 416 are received at receiving aircraft 402 may be utilized in other examples.

Self-location determination module 608, in some embodiments, may determine, by way of triangulation, a location of receiving aircraft 402 based on the location information for first transmitting aircraft 404 and second transmitting aircraft 406 (e.g., as embodied in first ADS-B signal 414 and second ADS-B signal 416, respectively), and on the bearings from which first ADS-B signal 414 and second ADS-B signal 416 are received, which may indicate the directions toward first transmitting aircraft 404 and second transmitting aircraft 406 from the perspective of receiving aircraft 402. A simplified example of triangulation associated with operating environment 400 of FIG. 4 is described below.

Location updating module 610, in some examples, may update the location of receiving aircraft 402 generated by self-location determination module 608 using additional available information. In some embodiments, location updating module 610 may receive information from IMU 626 that indicates acceleration and/or rotation of receiving aircraft 402 that has occurred since the most recently calculated location of receiving aircraft 402 to derive a current location of receiving aircraft 402. Also, in some examples, location updating module 610 may receive an indication of the barometric pressure experienced by receiving aircraft 402 from barometric pressure sensor 627, determine an altitude of receiving aircraft 402 from that information, and then update the current location of receiving aircraft 402 accordingly. Other types of information may be received to update the current location of receiving aircraft 402 in other embodiments.

GNSS receiving module 612 may receive information (e.g., from GNSS receiver 624) indicating the location of receiving aircraft 402. In some examples, calculation of the current location of receiving aircraft 402, as performed by self-location determination module 608, as described above, may be performed in the event access to a GNSS system via GNSS receiver 624 is denied, or in the event some other error condition is present that prevents generation of accurate location data via GNSS receiver 624. In other embodiments, calculation of the current location via self-location determination module 608 may be performed as an ongoing process in the event GNSS access is denied, or as a supplementary determination of location while GNSS access remains available.

Figure 9:
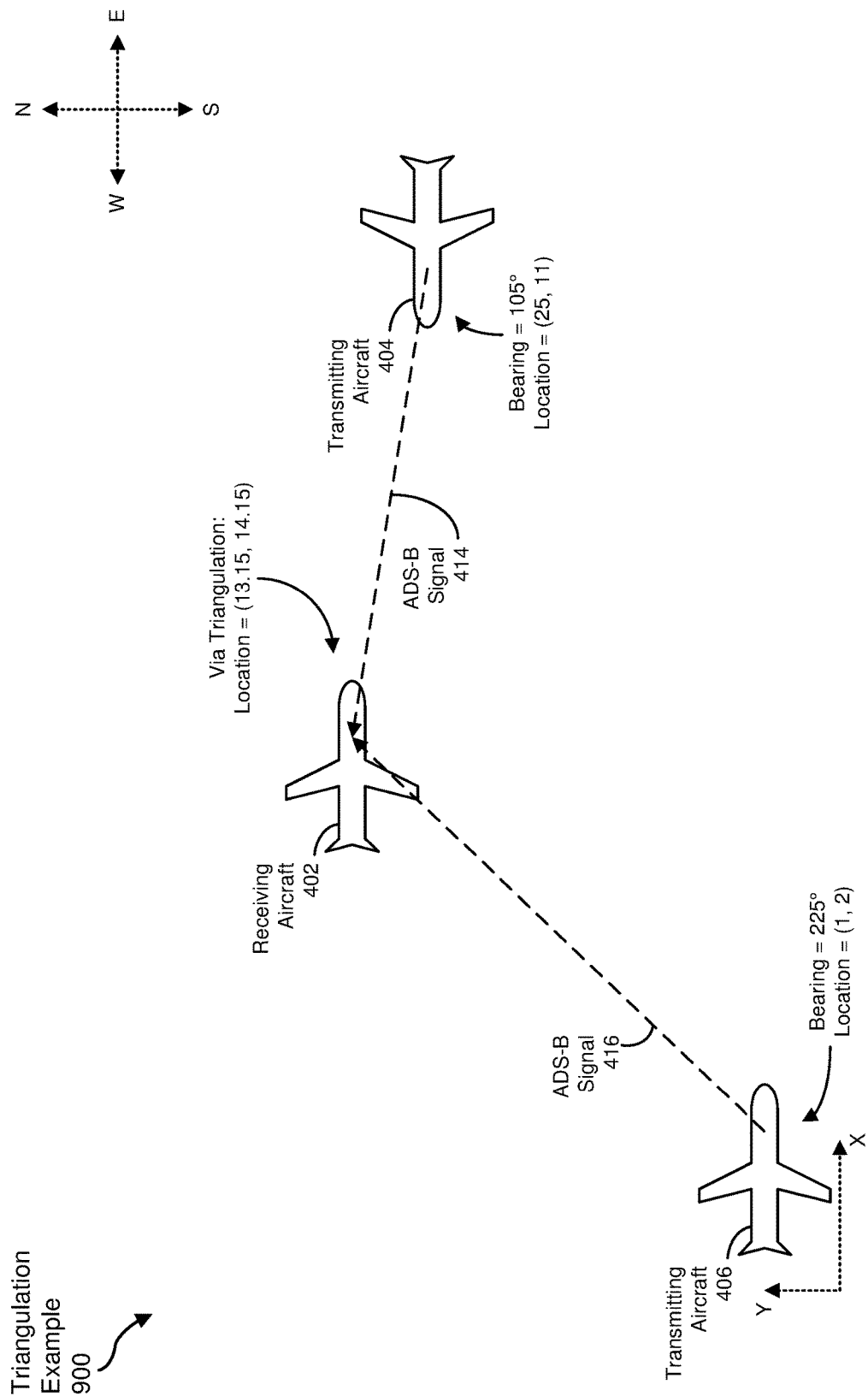
FIG. 9 is a block diagram describing an exemplary use of triangulation in determining a location of a receiving aircraft based on location and signal bearing information associated with signals received from at least two transmitting aircraft.

FIG. 9 is a block diagram describing a simplified triangulation example 900 in determining a location of receiving aircraft 402 within operating environment 400 based on location and signal bearing information associated with first ADS-B signal 414 and second ADS-B signal 416 received from first transmitting aircraft 404 and second transmitting aircraft 406, respectively. In triangulation example 900, the locations of first transmitting aircraft 404 and second transmitting aircraft 406 are stated in two-dimensional coordinates along x- and y axes oriented east-west and north-south, respectively, instead of three-dimensional longitude, latitude, and elevation values, to simplify the following discussion. However, the concepts described below may be extrapolated as needed to address situations in which longitude, latitude, and elevation values are employed.

As illustrated in FIG. 9, receiving aircraft 402 receives first ADS-B signal 414 that indicates the current location of first transmitting aircraft 404 is at x-y coordinates (25, 11). Further, receiving aircraft 402 determines that first ADS-B signal 414 is received from a bearing of 105 degrees, where 0 degrees designates north (i.e., the upward direction in FIG. 9), and 90 degrees indicates east (i.e., the rightward, positive-x direction in FIG. 9). Given these values, receiving aircraft 402 (e.g., via self-location determination module 608) may generate an equation that describes a line connecting first transmitting aircraft 404 and receiving aircraft 402. Within the x-y coordinate system, the equation may be stated in slope-intercept form ($y=mx+b$, where m is the slope of the line, and b is the y-intercept). Further, to generate the equation, the slope m may be taken as equal to the tangent of the bearing of first ADS-B signal 414, adjusted relative to the positive x-axis and progressing counterclockwise, may be taken as the slope m, which then allows the y-intercept b to be determined by replacing x and y with the coordinates of the first transmitting aircraft 404. Accordingly, in this case, a bearing of 105 degrees is adjusted to −15 degrees relative to the positive x-axis, resulting in slope $m=\tan(-15°)=-0.27$. Using this slope m, and inserting the coordinates $(x, y)=(25, 11)$ in the equation $y=mx+b$ yields $11=(-0.27(25))+b$, resulting in $b=17.7$. Therefore, the equation describing the line connecting first transmitting aircraft 404 and receiving aircraft 402 is $y=(-0.27)x+17.7$.

Regarding second transmitting aircraft 406, receiving aircraft 402 receives second ADS-B signal 416 that indicates the current location of second transmitting aircraft 406 is at coordinates (1, 2). Further, receiving aircraft 402 ascertains that second ADS-B signal 416 is received from a bearing of 225 degrees, or from the southwest, which happens to be the same values as the positive x-axis-adjusted. Accordingly, in this case, slope $m=\tan(225°)=1$. Employing $m=1$ and coordinates (1, 2) in $y=mx+b$ yields $2=1(1)+b$, or $b=1$. Consequently, the equation describing the line connecting second transmitting aircraft 406 and receiving aircraft 402 is $y=x+1$.

Given the equations for these two lines, the point at which these lines intersect, as indicated in FIG. 9, may be taken as the current location of receiving aircraft 402. To that end, simultaneous solution of the equations for the two lines will yield the desired values. For example, since both equations are in the form $y=mx+b$, the right side of the two equations may be equated to determine the x-coordinate for the location of receiving aircraft 402, and then the x-coordinate may then be used in either equation to find the corresponding y-coordinate. In this case, equating the right sides of the equations yields $x+1=-0.27x+17.7$, or $x=13.15$. Then, using the equation $y=x+1$, $y=13.15+1=14.15$. Therefore, the calculated coordinates for the location for receiving aircraft 402 in this example are (13.15, 14.15).

In at least some situations, one or more additional transmitting aircraft (not shown in FIG. 9) may be employed to transmit corresponding ADS-B signals that are received at receiving aircraft 402. The bearings of those ADS-B signals, as received at receiving aircraft 402, along with location information carried in those signals, may be employed in addition to the corresponding information associated with first ADS-B signal 414 and second ADS-B signal 416 to determine the current location of receiving aircraft 402. Such capability may be advantageous in various circumstances (e.g., when receiving aircraft 402, first transmitting aircraft 404, and second transmitting aircraft 406 lie on or close to the same line).

In view of the various embodiments described above in conjunction with FIGS. 1-9, the current location of a vehicle (e.g., an aircraft) may be determined to some level of confidence using location signals and their bearings relative to the vehicle. In the case of aircraft, use of such systems and methods of self-location may facilitate the ability of the aircraft to navigate away from the vicinity in which access to a GNSS system has been inadvertently or intentionally denied. Moreover, in some examples, this self-locating capability may be provided using equipment (e.g., ADS-B In receiver 622, TCAS unit 623, and so on) that is likely to already be available on the aircraft. Such a system does not require ground support and does not require the precise time synchronization between devices that is typically associated with other types of locating technology, such as pseudorange trilateration, in which distance to a particular location may be calculated by way of a timestamp encoded in a received signal that is compared to a time value at the receiver to generate a distance between the transmitter and the receiver.

EXAMPLE EMBODIMENTS

Example 1: A method for determining a location of a vehicle may include (1) receiving, at a receiving vehicle from a first transmitting vehicle, a first wireless signal carrying first data indicating a first location of the first transmitting vehicle, (2) determining a first bearing from which the first wireless signal is received at the receiving vehicle, (3) receiving, at the receiving vehicle from a second transmitting vehicle, a second wireless signal carrying second data indicating a second location of the second transmitting vehicle, (4) determining a second bearing from which the second wireless signal is received at the receiving vehicle, and (5) determining a receiving location of the receiving vehicle by triangulation using the first location, the first bearing, the second location, and the second bearing.

Example 2: The method of Example 1, where at least one of the first transmitting vehicle and the second transmitting vehicle may include an aircraft.

Example 3: The method of Example 2, where at least one of the first wireless signal and the second wireless signal may include an Automatic Dependent Surveillance-Broadcast (ADS-B) signal.

Example 4: The method of either Example 1 or Example 2, where (1) the receiving vehicle may include a receiving aircraft, and (2) receiving the first wireless signal, determining the first bearing, receiving the second wireless signal, determining the second bearing, and determining the receiving location may be performed at the receiving aircraft.

Example 5: The method of Example 4, where the receiving aircraft may include a plurality of single-element antennas that receive the first wireless signal and the second wireless signal.

Example 6: The method of Example 5, where the plurality of single-element antennas may include a plurality of single-element ADS-B In antennas.

Example 7: The method of Example 4, where the receiving aircraft may include a multielement antenna that receives the first wireless signal and the second wireless signal.

Example 8: The method of Example 7, where the multielement antenna may include a multielement Traffic Collision Avoidance System (TCAS) antenna that is employed to measure a first angle of arrival of the first wireless signal and a second angle of arrival of the second wireless signal.

Example 9: The method of Example 4, where (1) the method may further include determining, at the receiving aircraft, an altitude of the receiving aircraft, and (2) determining the receiving location may be further based on the altitude of the receiving aircraft.

Example 10: The method of Example 9, where determining the altitude of the receiving aircraft may be performed barometrically.

Example 11: The method of any of Examples 1-3, where the method may further include (1) generating, at the receiving location, movement data indicating a change in the receiving location, and (2) updating the receiving location using the movement data.

Example 12: The method of Example 11, where generating the movement data may be performed by an inertial measurement unit (IMU).

Example 13: The method of any of Examples 1-3, where the method may further include navigating, based on the receiving location, the receiving vehicle away from the receiving location.

Example 14: The method of any of Examples 1-3, where (1) the first data may include a latitude of the first transmitting vehicle and a longitude of the first transmitting vehicle, and (2) the second data may include a latitude of the second transmitting vehicle and a longitude of the second transmitting vehicle.

Example 15: The method of Example 14, where (1) the first data may further include an altitude of the first transmitting vehicle, (2) the second data may further include an altitude of the second transmitting vehicle.

Example 16: The method of Examples 1-3, where (1) the method may further include determining that information from a satellite navigation system is currently inaccessible at the receiving vehicle, and (2) the determining of the receiving location may be performed in response to determining that the information from the satellite navigation system is currently inaccessible at the receiving vehicle.

Example 17: A navigating vehicle may include (1) a wireless signal receiver including a plurality of antennas, where the wireless signal receiver (a) receives, from a first transmitting vehicle using the plurality of antennas, a first wireless signal carrying first data indicating a first location of the first transmitting vehicle, (b) determines a first bearing from which the first wireless signal is received based on at least one first phase difference of the first wireless signal among the plurality of antennas, (c) receives, from a second transmitting vehicle using the plurality of antennas, a second wireless signal carrying second data indicating a second location of the second transmitting vehicle, and (d) determines a second bearing from which the second wireless signal is received based on at least one second phase difference of the second wireless signal among the plurality of antennas, and (2) a processor that determines a location of the navigating vehicle by triangulation using the first location, the first bearing, the second location, and the second bearing.

Example 18: The navigating vehicle of Example 17, where (1) the navigating vehicle may further include an inertial measurement unit (IMU) that generates movement data indicating a change in the location of the navigating vehicle, and (2) the processor may further update the location of the navigating vehicle using the movement data.

Example 19: A non-transitory computer-readable medium including one or more computer-executable instructions that, when executed by at least one processor of a computing device, may cause the computing device to perform a method including (1) receiving first data indicating a first location of a first transmitting vehicle carried via a first wireless signal received at a receiving vehicle, (2) receiving a first bearing from which the first wireless signal is received from the first transmitting vehicle at the receiving vehicle, (3) receiving second data indicating a second location of a second transmitting vehicle carried via a second wireless signal received at the receiving vehicle, (4) receiving a second bearing from which the second wireless signal is received from the second transmitting vehicle at the receiving vehicle, and (5) determining a current location of the receiving vehicle based on the first location, the first bearing, the second location, and the second bearing.

Example 20: The non-transitory computer-readable medium of Example 19, where the method may further include (1) receiving an error indication that location data from a satellite navigation system is unavailable, and (2) performing the determining of the current location of the receiving vehicle in response to receiving the error indication.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive vehicle location data in wireless signals that are received at a receiving vehicle from transmitting vehicles, as well as bearing data for those signals, transform that data into a current location of the receiving vehicle, and use the current location to navigate the receiving vehicle. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
receiving, at a receiving vehicle from a first transmitting vehicle, a first wireless signal carrying first data indicating a first location of the first transmitting vehicle;
determining a first bearing from which the first wireless signal is received at the receiving vehicle;
receiving, at the receiving vehicle from a second transmitting vehicle, a second wireless signal carrying second data indicating a second location of the second transmitting vehicle;
determining a second bearing from which the second wireless signal is received at the receiving vehicle; and
determining a receiving location of the receiving vehicle by triangulation using the first location, the first bearing, the second location, and the second bearing.

2. The method of claim 1, wherein at least one of the first transmitting vehicle and the second transmitting vehicle comprises an aircraft.

3. The method of claim 2, wherein at least one of the first wireless signal and the second wireless signal comprises an Automatic Dependent Surveillance-Broadcast (ADS-B) signal.

4. The method of claim 1, wherein:
the receiving vehicle comprises a receiving aircraft; and
receiving the first wireless signal, determining the first bearing, receiving the second wireless signal, determining the second bearing, and determining the receiving location are performed at the receiving aircraft.

5. The method of claim 4, wherein the receiving aircraft comprises a plurality of single-element antennas that receive the first wireless signal and the second wireless signal.

6. The method of claim 5, wherein the plurality of single-element antennas comprises a plurality of single-element ADS-B In antennas.

7. The method of claim 4, wherein the receiving aircraft comprises a multielement antenna that receives the first wireless signal and the second wireless signal.

8. The method of claim 7, wherein the multielement antenna comprises a multielement Traffic Collision Avoidance System (TCAS) antenna that is employed to measure a first angle of arrival of the first wireless signal and a second angle of arrival of the second wireless signal.

9. The method of claim 4, wherein:
the method further comprises determining, at the receiving aircraft, an altitude of the receiving aircraft; and
determining the receiving location is further based on the altitude of the receiving aircraft.

10. The method of claim 9, wherein determining the altitude of the receiving aircraft is performed barometrically.

11. The method of claim 1, further comprising:
generating, at the receiving location, movement data indicating a change in the receiving location; and
updating the receiving location using the movement data.

12. The method of claim 11, wherein generating the movement data is performed by an inertial measurement unit (IMU).

13. The method of claim 1, further comprising:
navigating, based on the receiving location, the receiving vehicle away from the receiving location.

14. The method of claim 1, wherein:
the first data comprises a latitude of the first transmitting vehicle and a longitude of the first transmitting vehicle; and
the second data comprises a latitude of the second transmitting vehicle and a longitude of the second transmitting vehicle.

15. The method of claim 14, wherein:
the first data further comprises an altitude of the first transmitting vehicle; and
the second data further comprises an altitude of the second transmitting vehicle.

16. The method of claim 1, wherein:
the method further comprises determining that information from a satellite navigation system is currently inaccessible at the receiving vehicle; and
the determining of the receiving location is performed in response to determining that the information from the satellite navigation system is currently inaccessible at the receiving vehicle.

17. A navigating vehicle comprising:
a wireless signal receiver comprising one or more antennas, wherein the wireless signal receiver:
receives, from a first transmitting vehicle using the antennas, a first wireless signal carrying first data indicating a first location of the first transmitting vehicle;
determines a first bearing from which the first wireless signal is received based on at least one first phase difference of the first wireless signal among the antennas;
receives, from a second transmitting vehicle using the antennas, a second wireless signal carrying second data indicating a second location of the second transmitting vehicle; and
determines a second bearing from which the second wireless signal is received based on at least one second phase difference of the second wireless signal among the antennas; and
a processor that determines a location of the navigating vehicle by triangulation using the first location, the first bearing, the second location, and the second bearing.

18. The navigating vehicle of claim 17, wherein:
the navigating vehicle further comprises an inertial measurement unit (IMU) that generates movement data indicating a change in the location of the navigating vehicle; and
the processor further updates the location of the navigating vehicle using the movement data.

19. A non-transitory computer-readable medium comprising one or more computer-executable instructions that, when executed by at least one processor of a computing device, cause the computing device to perform a method comprising:
receiving first data indicating a first location of a first transmitting vehicle carried via a first wireless signal received at a receiving vehicle;
receiving a first bearing from which the first wireless signal is received from the first transmitting vehicle at the receiving vehicle;
receiving second data indicating a second location of a second transmitting vehicle carried via a second wireless signal received at the receiving vehicle;
receiving a second bearing from which the second wireless signal is received from the second transmitting vehicle at the receiving vehicle; and
determining a current location of the receiving vehicle based on the first location, the first bearing, the second location, and the second bearing.

20. The non-transitory computer-readable medium of claim 19, wherein the method further comprises:
receiving an error indication that location data from a satellite navigation system is unavailable; and
performing the determining of the current location of the receiving vehicle in response to receiving the error indication.

* * * * *